(12) United States Patent
Narayanan et al.

(10) Patent No.: US 7,659,217 B2
(45) Date of Patent: Feb. 9, 2010

(54) DURABLE AND FIRE RESISTANT NONWOVEN COMPOSITE FABRIC BASED GARMENT

(75) Inventors: Vasanthakumar Narayanan, Morristown, TN (US); Gary Arinder, Bean Station, TN (US); Stephen Szczesuil, Natick, MA (US)

(73) Assignee: Nanosyntex, Inc., Tomball, TX (US)

( * ) Notice: Subject to any disclaimer, the term of this patent is extended or adjusted under 35 U.S.C. 154(b) by 0 days.

(21) Appl. No.: 12/156,847

(22) Filed: Jun. 6, 2008

(65) Prior Publication Data

US 2008/0242175 A1    Oct. 2, 2008

Related U.S. Application Data

(63) Continuation of application No. 11/152,918, filed on Jun. 15, 2005, now abandoned.

(60) Provisional application No. 60/581,794, filed on Jun. 22, 2004.

(51) Int. Cl.
   *B32B 5/26* (2006.01)
   *B32B 27/12* (2006.01)
   *A41D 13/00* (2006.01)

(52) U.S. Cl. .................... 442/319; 442/136; 442/141; 442/148; 442/153; 442/165; 442/168; 442/381; 442/387; 442/392; 428/920; 428/921; 8/115.7

(58) Field of Classification Search .................. None
   See application file for complete search history.

(56) References Cited

U.S. PATENT DOCUMENTS 3,502,537 A * 3/1970 Pearson et al. ............ 442/80
3,862,877 A * 1/1975 Camden .................... 428/111

(Continued)

FOREIGN PATENT DOCUMENTS

GB    2409827 A  *  7/2005

OTHER PUBLICATIONS

McIntyre, Karen Bitz, "Misson: to sooth and protect: offering the right combination of comfort and protection is the goal of nonwovens in personal protection", Nonwovens Industry, v. 38, n. 1, (Jan. 1, 2007), p. 56 (5).*

(Continued)

*Primary Examiner*—Jennifer A Chriss
(74) *Attorney, Agent, or Firm*—Novak Druce + Quigg LLP

(57) ABSTRACT

The present invention is directed to the design and manufacturing of a field durable, repeatedly launderable and permanently fire resistant, comfortable and economical FR nonwoven composite fabric based garment, which meets the stringent requirements of military combat uniform clothing. The nonwoven based garment is designed to replace the traditional woven textile fabric used in the military today. The novel garment of the current invention is constructed using a unique spunlaced or hydroentangled FR nonwoven composite fabric that exhibits mechanical, physical, durability and comfort characteristics similar to or better than that of the current woven military uniform fabric. In particular, the present invention contemplates the nonwoven composite fabric used to make the garment is prepared by combining at least two separate nonwoven webs forming the inside and outside layers of the garment. An optional rip-stop element such as a loosely knitted fabric may be sandwiched between the two nonwoven webs to improve the dimensional stability of the entire garment. Hydroentangling process combines the individual nonwoven webs to form a coherent base nonwoven composite fabric before dyeing and printing which is then made fire resistant by application of a phosphate ester chemical in an ammonia-cure process to form the FR nonwoven composite fabric of the garment.

12 Claims, 3 Drawing Sheets

Cross-Sectional View of the Durable and Fire Resistant Nonwoven Composite Fabric (Type 1)

1. Outer and Inner Layer Carded Nonwoven webs made of Nylon and cotton fibers

2. Middle Layer Knitted Fabric

U.S. PATENT DOCUMENTS

| | | |
|---|---|---|
| 3,933,304 A | 1/1976 | Judd |
| 3,988,343 A | 10/1976 | Lilyquist |
| 4,748,705 A * | 6/1988 | Johnson et al. ............... 8/115.7 |
| 5,240,764 A | 8/1993 | Haid et al. |
| 5,334,446 A | 8/1994 | Quantrille et al. |
| 5,480,458 A * | 1/1996 | Fleming et al. ............ 8/115.58 |
| 5,587,225 A | 12/1996 | Griesbach et al. |
| 5,874,159 A | 2/1999 | Cruise et al. |
| 6,669,799 B2 | 12/2003 | Putnam et al. |
| 6,692,541 B2 | 2/2004 | Carlson et al. |
| 6,735,832 B1 | 5/2004 | Putnam et al. |
| 2003/0166369 A1 | 9/2003 | De Leon et al. |
| 2004/0016091 A1 | 1/2004 | Rivera et al. |
| 2005/0022321 A1 | 2/2005 | Hartgrove |
| 2005/0118919 A1 * | 6/2005 | Link et al. ................... 442/414 |

OTHER PUBLICATIONS

"Enhancing the Mobility and Survivability of Soldiers through the use of Light-weight and Flame Retardant Nonwoven Composite Fabrics", 2006 Navy Opportunity Forum held Jun. 5-7, 2006.*

* cited by examiner

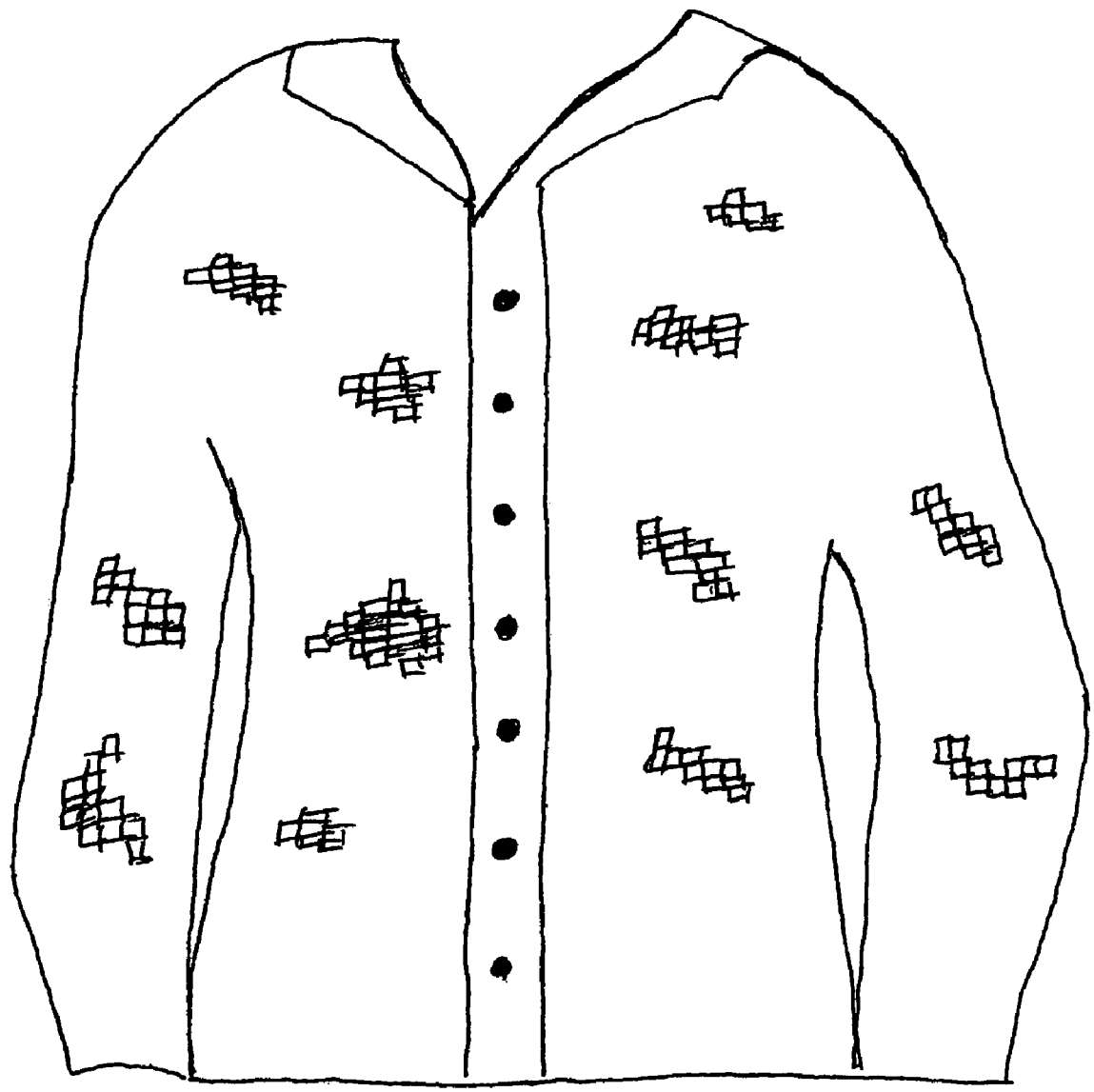
Figure 1. Durable and Fire Retardant Military Garment Made from Nonwoven Composite Fabric

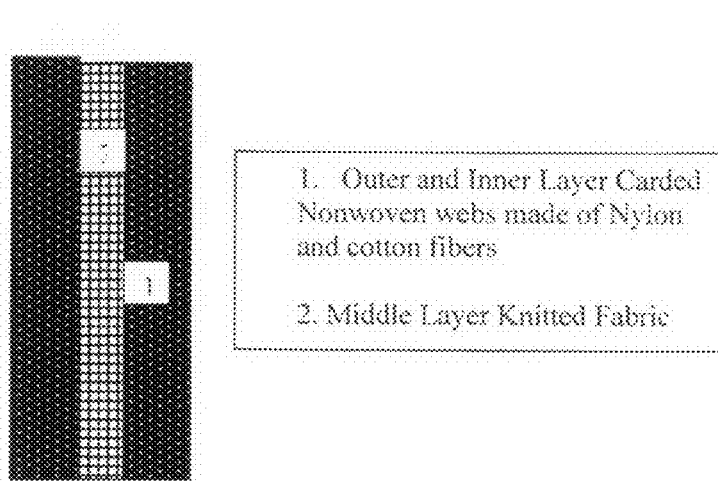
Figure 2A. Cross-Sectional View of the Durable and Fire Resistant Nonwoven Composite Fabric (Type 1)
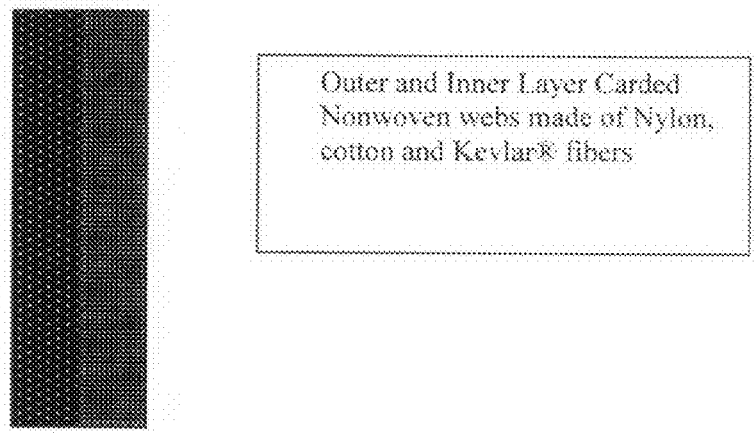
Figure 2B. Cross-Sectional View of the Durable and Fire Resistant Nonwoven Composite Fabric (Type 2)

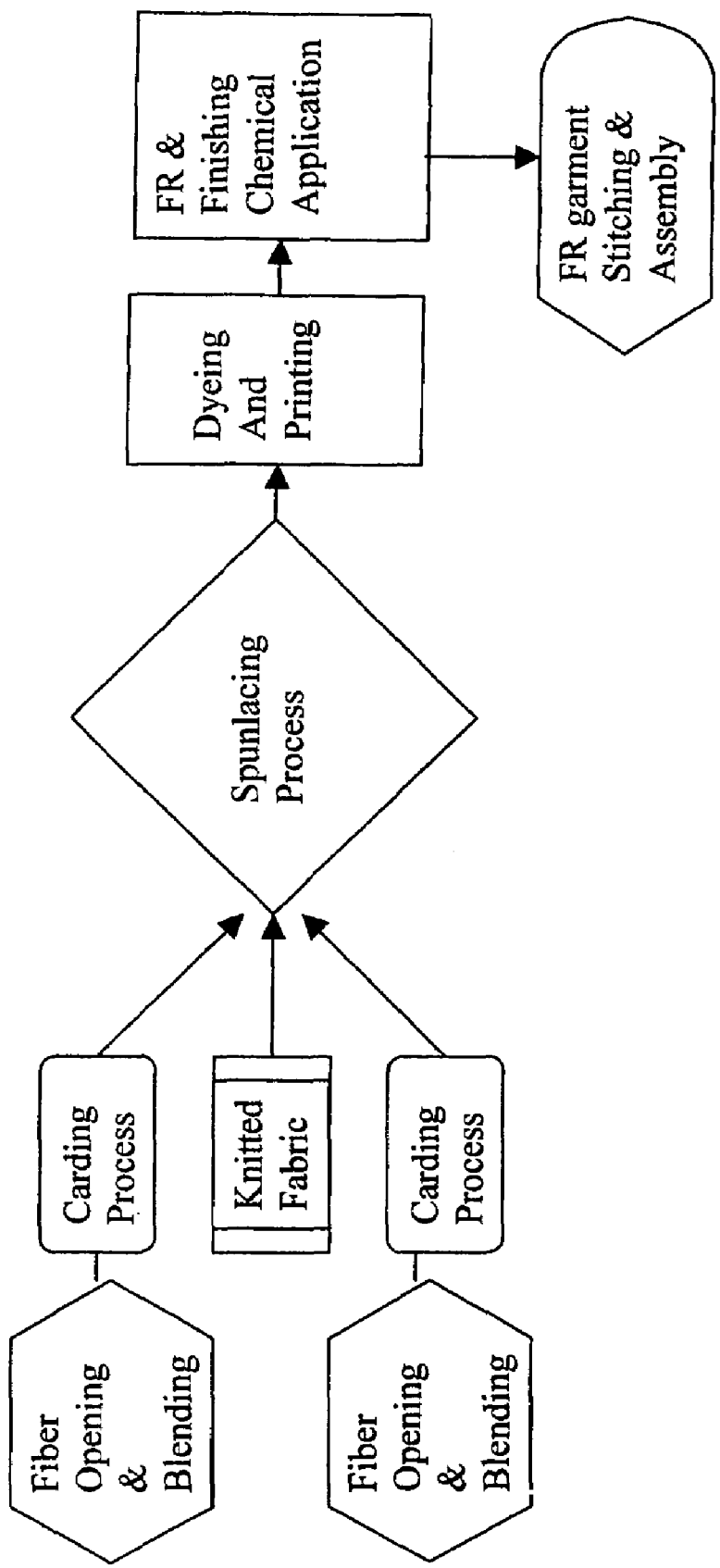
Figure 3. Flow Chart of the Nonwoven Composite Fabric Based Military FR Garment Manufacturing Process

DURABLE AND FIRE RESISTANT NONWOVEN COMPOSITE FABRIC BASED GARMENT

CROSS-REFERENCE TO RELATED APPLICATIONS, IF ANY

This application is continuation-in-part of co-pending utility application Ser. No. 11/152,918, filed 15 Jun. 2005. application Ser. No. 11/152,918 is hereby incorporated by reference. This application also claims the benefit under 35 U.S.C. § 119(e) of provisional application Ser. No. 60/581,794, filed 22 Jun. 2004. Application Ser. No. 60/581,794 is here by incorporated by reference.

STATEMENT REGARDING FEDERALLY SPONSORED RESEARCH OR DEVELOPMENT

This invention was developed during the course of Contracts No. M67854-04-C-3006, No. M67854-05-C-6502 and No. M67854-07-C-6530 for MARCOR SYSCOM of the Department of Defense. The government may gave certain rights in this invention.

REFERENCE TO A MICROFICHE APPENDIX, IF ANY

Not applicable.

FIELD OF THE INVENTION

The present invention relates generally to the design and manufacture of a field durable, repeatedly launderable and permanently fire resistant (FR) military combat uniform garment, made from a multi-layered nonwoven composite fabric containing blends of commodity synthetic and cellulosic fibers that provides superior comfort and economics. The main utilization of the fire resistant garment of the present invention is to replace the fire resistant garments made of more expensive woven fabrics.

BACKGROUND OF THE INVENTION

Nonwoven composite fabric manufacturing is the fastest and the most economical way of converting fibers to fabrics. Before discussing the importance of FR nonwoven composite fabrics for use in military and functional garment applications, it is important to outline the basics of the manufacturing of conventional woven fabrics presently used in the military garments to clearly distinguish the difference between the woven and nonwoven fabrics.

Yarn Formation: The manufacturing of conventional woven textile fabric that is presently used to make the military garments is a laborious and multi-step (over 15) process with very slow production speeds. The production of conventional textile fabrics from staple fibers begins with the opening of bales of compacted fibers, synthetic or natural, combing, and then carding, whereby the fibers are individualized and aligned, the web from the doffer of the card then combined to form a thick rope called sliver. Multiple strands of sliver are then processed on drawing frames to further align the fibers, blend, improve uniformity and reduce the sliver's diameter. The drawn sliver is then fed into a roving machine to produce roving with false twist to provide some integrity. The roving is then fed into the ring or rotor spinning machine to be spun into yarn. The smaller yarn packages from the spinning machines are placed onto a winder where they are transferred into larger spools. The yarns are then wound onto a warp beam to be woven into fabrics.

Woven Fabric Formation: The woven fabric from the loom consists of warp and weft yarns. The warp yarns run in the machine direction whereas the weft yarns run in the cross direction or perpendicular to the warp yarns. The warp beams supply the warp yarns by unwinding and the weft yarns are inserted by high-speed shuttle, air or water to complete the fabric design. The warp yarns themselves are subjected to a sizing treatment with starch to provide some stiffness and abrasion resistance to take them through the process of weaving. The sizing treatment is removed by scouring and bleaching after the fabric is made on the loom before the fabric can be dyed and finished. One of the limiting factors of woven fabrics, apart from being a multi-step process, is the very slow production speed, i.e. a few feet (1-2) per minute even on the most modern looms.

On the other hand, nonwoven composite fabrics, when properly designed and processed, offer both technical and economic advantages, especially in the area of functional apparel. From an economics standpoint, the production of nonwoven fabrics and their composites using spunlaid and carded webs is known to be more efficient than traditional textile processes, with many fewer steps (less than 5) and faster production rates with machine speeds over 100 feet per minute. From a technology standpoint, multiple layers of fibers with varying functionalities, such as water repellent or absorbent and fire retardant, can be incorporated to provide unique structures that are not possible to manufacture by traditional yarn spinning and weaving techniques.

Nonwoven Composite Fabric/Garment: Nonwoven composite fabrics based FR garments can be made suitable for use in a wide variety of military and other applications where the efficiency with which the garments/fabrics is manufactured provides a significant economic advantage for these fabrics versus traditional woven textiles. However, nonwoven fabrics, especially the FR chemical treated fabrics, have been unable to penetrate the functional and everyday wear garment markets because of commonly known disadvantages, such as poorer drape, aesthetics, stiffness, abrasion resistance, launderability, tear resistance, recovery after stretching, etc. when compared with woven FR fabrics. Many of the nonwoven processes are intended for creating disposable or non-durable articles, such as pillow covers, baby diapers, sanitary napkins, medical gowns etc. at faster production speeds and cheaper price. None of the currently available nonwoven technologies, when used alone, offer a durable fabric for apparel or garment end use application. The challenge has been to judiciously use several known bonding methods and finishing treatments, while using proper fiber blends, additive, finishing chemicals and fabric construction. Attempts have been made to develop nonwoven fabrics for everyday wear, such as shirts and pants, as referenced in U.S. Pat. No. 3,933,304, where a washable spunlaced nonwoven cloth containing binder chemicals has been disclosed. U.S. Pat. No. 3,988,343 discloses a nylon fabric treated with binder chemicals. U.S. Pat. No. 5,874,159 discloses a spunlaced fabric containing a net made of a polymer that melts at lower temperature than base fibers and bonds with the nonwoven layers and thus provides the necessary durability during the end use application. More recently, U.S. Patent Application No. 2003/0166369 A1 describes a durable nonwoven garment with elastic recovery where a carded web is hydroentangled and modified with very high levels of acrylic binder before being assembled into a garment. The absence of any of these materials from the prior art in the commercial marketplace for everyday wear is an indication that further improvement and enhancement are required with respect to the processing, finishing and assembling of nonwoven based materials for apparel usage, especially for durable fire resistant military garment applications.

Hydroentangled/Spunlaced Nonwovens: It is an established fact that the best nonwoven bonding technology that is available on a commercial basis today to create fabrics that somewhat mimic the properties of woven fabrics, is the hydroentangled or spunlaced nonwoven fabric technology. The entanglement and the twisting of the fibers that occur in the case of spunlace fabrics is somewhat similar to the twist in the yarns of the woven fabrics and thus, spunlace fabrics provide the best drape characteristics among the commercially available nonwoven fabrics. The use of the right type of nozzles, their length, design, diameter and number of holes per jet strip, coupled with the position of the jet manifolds, the number of manifolds per side of the fabric and the water jet pressure critically impact the final fabric properties, especially the bonding of fibers and thus the strength and surface abrasion resistance. Even the spunlace nonwoven composites exhibit a higher degree of elongation or stretch than desired and poorer recovery from deformation. In addition, spunlace fabrics without any post thermal and chemical treatment show much poorer launderability and abrasion resistance compared to the woven fabrics. The loose end surface fibers need to be bound to the matrix of the fabric by thermal and/or chemical treatment techniques. Without these critical chemical treatments, the fabric is rendered useless just after a single laundering cycle.

The art of combining various nonwoven layers with and without support scrim through hydroentangling for multiple end use application is already established in the literature. Different nonwoven layers or webs, such as spunlaid or spunbonded, carded, wet-laid and needle-punched, can be combined with and without reinforcing scrim or nonwovens as referenced in U.S. Pat. Nos. 5,240,764, 5,334,446, 5,587,225, 6,669,799, 6,735,832 B1, and U.S. Patent Application No. 2005/0022321 A1 to provide unique composite structures for various end use applications. U.S. Patent Application No. 2004/0016091 by Rivera et al. discloses a method of forming a two-sided, nonwoven composite intended for use in durable three-dimensional imaged surfaces that is resistant to washing. The composite of the Rivera et al. application has been designed for applications other than functional apparel, as the fibrous and scrim elements incorporated in the application do not withstand the rigors of the military and outdoor end use. In addition, according to the Rivera et al. application, the fiber layers are separated by the scrim to avoid intermixing of the layers, which leads to delamination and failure of the composite based garment. The current invention addresses the need for intimate bonding, additional down-stream FR and binder chemical treatment to "lock" the twisted configuration of fibers for enhancing the abrasion resistance and wash durability.

Carded Precursor Webs: The carded precursor nonwoven webs contain staple or cut fibers used as the individual layers of the final bonded spunlace nonwoven composite fabric. It is possible to use synthetic fibers such as polyester, or nylon in blends with natural fibers, such as cotton, and regenerated fibers, such as rayon and cellulose acetate or blends of both types of fibers. For carded webs, the useful fiber denier ranges from 1-6 dpf and the fiber length ranges from 0.5-3 inches. Basis weight of the fabric ranges from 0.5 oz/yd$^2$ to 6 oz/yd$^2$. The fabric properties are determined by the optimization of fiber denier, length and construction. The compacted fibers from the bales are fed into various pre-opening and blending stations before being fed to the licker-in roll of the carding machine. The difference in surface velocity between the main cylinder and the numerous worker rolls or flat circulating wire strip located above the main cylinder is the reason for the thorough opening, individualization and parallel alignment of fiber web. The web can be cross-laid at a 45-degree angle using multiple layers to provide balanced properties in the machine and cross direction. The web integrity is possible only by bonding employing thermal calendering, needle punching or spunlacing techniques.

Military Uniform Garments: To date, the use of nonwovens in the military sector has been restricted mostly for special and niche applications, such as disposable apparel and shoe interlinings, due to limitations in performance. The FR military garments made using FR nonwoven composites of the current invention have the potential to offer relief from heat stress combined with better economics. However, the military applications require functional garments with specific performance attributes. The functional properties of current woven uniforms are fixed or limited by the properties of the individual yarns that lie in a two-dimensional plane. The three-dimensional, nonwoven, composite, fabric offers numerous possibilities of utilizing various fibers and fiber blends in multiple webs or layers and additive chemical technologies to impart specific functional characteristics for the intended use.

Dyeing and Printing: The polyester based nonwovens are traditionally dyed using disperse dyes where heat is applied to open the fiber structure for mechanical incorporation of dye molecules. In the case of nylon-based nonwovens, the fabrics can be dyed using acid, basic or vat dye molecules. Cellulosic fibers may also be dyed using the vat dyes. The vat dyes offer the best solution for color fastness and thus, durability of shade in end use. Deep shade is not a requirement for the military and outdoor garment fabrics; however, deep dyeing is possible with nylon-based garments.

Finishing Treatments: The finishing treatments consist of imparting abrasion resistance, wash durability, water repellency and fire resistance based on the needs of the end use application. The finishing treatments can be carried out using commonly known chemicals, such as phosphorous, silicone, acrylate, melamine, urethane, etc. using spraying, padding and curing or knife coating techniques commonly known in the industry. Spraying or padding intumescent fire retardant finishing chemicals can provide additional improvements in the fire resistance characteristics. Whatever the finishing treatment may be, care must be taken to avoid stiffening the fabric and reducing breathability and physical properties.

SUMMARY OF THE INVENTION

The present invention is directed to the design and manufacture of a field durable, repeatedly launderable and permanently fire resistant nonwoven based fabric/garment that meets the stringent performance requirements of military combat uniform clothing. In particular, the present invention contemplates that a field durable garment is formed from a permanently fire resistant, nonwoven composite fabric that consists of at least two nonwoven fibrous webs that form the inside and outside layers of the final nonwoven composite fabric, with an optional rip-stop layer, made from a loosely knitted fabric, sandwiched between the individual nonwoven webs/layers. All of the individual layers are subjected to intimate mechanical bonding by hydroentanglement process using fluid energy to provide sufficient integrity and dimensional stability for down stream processing and end use applications. Additionally, FR chemicals coupled with secondary finishing chemicals are applied to impart highly durable fire resistance, abrasion resistance and wash durability. By formation of a nonwoven composite fabric in this fashion, a field durable, repeatedly launderable and permanently fire resistant garment is tailored for military end use.

In accordance with the present invention, a method of making a nonwoven based military combat uniform garment includes the steps of first creating a nonwoven composite fabric that consists of an outside and an inside carded nonwoven web/layer. The outside and inside nonwoven webs/layers are initially combined by hydroentanglement with high pressure water jets, with or without a rip-stop made of a loosely knitted fabric layer, to form the nonwoven composite fabric that makes the garment. In a particularly preferred embodiment, the outside and inside layers of the nonwoven composite fabric contain carded webs with flammable synthetic staple fiber, such as nylon, in blends with flammable natural cellulosic fiber, such as cotton. The military has used the nylon/cotton (NYCO) blend woven fabrics for many years and thus, similar fiber blends were selected to produce the nonwoven composite fabrics of the current invention. The nonwoven webs may be cross-lapped for obtaining balanced properties in the finished fabric. An optional middle rip-stop layer may be sandwiched between the carded webs and bonding of the individual webs, with or without the rip-stop fabric, is mainly achieved by the spunlacing/hydroentangling process. The resulting "coherent base nonwoven composite fabric" is the starting base fabric for producing the final FR nonwoven composite fabric found to provide a garment with excellent abrasion resistance. Care should be taken to ensure that all the individual webs are intimately bonded to avoid fabric delamination.

Without proper bonding conditions, the fabric lacks strength and thus durability for down-stream treatment and end use applications.

The most preferred method to make the nonwoven composite of the present invention is to intimately bond the individual unbonded, nonwovens, without any integrity, into a "coherent nonwoven fabric" via the hydroentangling process, where a minimum fluid pressure of 3000 PSI is employed at least on two jet manifold to act on the top and bottom sides of the base nonwoven composite fabrics. To achieve the desired durability, it is contemplated that at least 5 jet strips or manifolds are placed on each side of the composite with a 100-mesh support screen to obtain the desired textile-like finish. Optionally, the webs may be re-passed through the jet strips with the sides reversed to obtain even further enhanced surface abrasion resistance.

The nonwoven fabric composite of the garment is dyed and printed with camouflage patterns using traditional textile dyes such as vat, disperse, acid, basic dyes, pigments, etc. using traditional textile dyeing and printing equipment. The fabric at this stage is still very much flammable with very poor launderability.

All of the dyed and printed nonwoven composite fabrics are subjected to a down stream finishing treatment with phosphate ester based fire retardant chemical cured by ammonia gas to impart permanent FR characteristics to the nonwoven composite fabrics. Secondary finishing chemicals containing melamine formaldehyde and acrylic copolymers are applied to further enhance the abrasion resistance and launderability of the FR nonwoven composite fabrics. The nonwoven composite fabrics without the addition of FR and the secondary finishing chemicals do not have the required abrasion resistance and wash durability. Some even fail or completely disintegrate within 5 laundering cycles. Apart from being able to process using traditional textile equipment as referenced above, the FR nonwoven composite fabrics are assembled into suitable military garments using commonly known stitching techniques using sewing threads and/or non-traditional seamless techniques, as employed in laser and ultrasonic welding processes.

The above summary of the present invention is not intended to describe each illustrated embodiment or every implementation of the present invention. The detailed descriptions that follow more particularly exemplify these embodiments.

BRIEF DESCRIPTION OF THE DRAWINGS

FIG. 1 is a front view of the durable and fire resistant military garment made from nonwoven composite fabric.

FIG. 2A is a cross sectional view of one embodiment of the nonwoven layers of the durable and fire resistant military garment.

FIG. 2B is a cross sectional view of another embodiment of the nonwoven layers of the durable and fire resistant military garment.

FIG. 3 is a flow diagram of the manufacturing set-up for creating the durable and fire retardant nonwoven composite fabric for the military garment.

DESCRIPTION OF THE PREFERRED EMBODIMENT

In the following detailed description of the invention, specific methods employed to create a unique and novel military FR combat utility uniform garment, made of a field durable, repeatedly launderable and permanently fire resistant nonwoven composite fabric, are elucidated to enable a full and thorough understanding of the current invention. It should however be recognized, that it is not intended in the following text to limit the invention only to the particular methods described. The specific terms employed to describe the uniqueness of the invention are merely used in the descriptive sense for the purpose of illustration and not for the purpose of limitation. It will be apparent that the invention is susceptible to numerous variations and changes within the spirit of the teachings herein.

"Field Durability" relates to the ability of the fabric of the garment to withstand the rigors of the military combat operation. More specifically, it relates to the abrasion resistance characteristics of the FR fabrics. The current FR military standard Nomex® woven fabrics have extremely poor abrasion resistance properties and thus field durability. When tested according to ASTM D 3884 standard, the Nomex® fiber based fabrics are severely damaged within 100 cycles of abrasion using the most abrasive HS-18 wheels of the Taber Abrasion machine. The FR nonwoven composite fabrics of the current invention can easily withstand over 100 abrasion cycles using the same test protocol with a strength retention of at least 50% of the unabraded fabric at 100 cycles. Additionally, the FR treated nonwoven composite fabrics outperform the untreated nonwoven composite fabrics in terms of abrasion resistance. The nonwoven fabric construction, spunlacing processing conditions coupled with the right selection of fibers and their blends and treatment chemicals impart "Field Durability" to the FR nonwoven composite fabrics of the FR garment.

"Permanently Fire Resistant" characteristics of the FR fabrics of military garments relate to the ability to be laundered multiple times and used in the field without any significant loss in the fabric fire retardancy. The general requirement is that the fabrics of the FR garments pass ASTM D 6413 test after being subjected to at least 25 home laundering cycles. The phosphonium sulfate based FR molecules are embedded into the cellulosic fibers of the FR nonwoven composite fabric and polymerized using an ammonia-cure process in such a way that they do not leach out during the laundering process and last for the lifetime of the fabric/garment. The FR chemical treated nonwoven composite fabric of the FR garments of current invention passed the ASTM D 6413 test after 25 home laundering cycles whereas a military woven fabric with similar fiber blend ratio and treated using the same FR chemicals did not pass the ASTM D 6413 just after a single home laundering cycle. Current FR treated woven fabrics based products using similar process cannot contain more than 12% by weight of the nylon fibers as they fail to pass the ASTM D 6413 after laundering. In contrast, it is possible to have at least 50% of nylon fibers in the nonwoven fabric construction of the current invention and still pass the ASTM D 6413 test after 25 home laundering cycles.

"Repeatedly Launderable" relates generally to the fabric appearance and any pilling issues after subjecting the fabrics of the FR garment to the conditions specified in AATCC 124, Appearance of Fabrics after Repeated Home Laundering. The untreated nonwoven base fabrics of the current invention fail the test or are severely damaged just after a single home laundering cycle whereas the FR treated and finished nonwoven fabrics can be subjected to at least 25 home launderings without any noticeable change in appearance and without any pilling issues.

The demand for using all FR clothing and equipage is increasing in the military because of the use of unconventional means of attack by the enemies at the war front. Current non-FR combat clothing used by the U.S. military in theater do not offer any fire protection leading to potential burn injuries to the soldiers. The military investigated converting the current uniform garments made of flammable nylon/cotton (NYCO) woven fabrics into FR protective garments but were largely unsuccessful in their efforts. The FR fabric of choice today is the Nomex® fiber based woven fabric for the U.S. military. The Nomex®, a meta-aramid type fiber is made inherently fire resistant through its unique chemical structure by Dupont® chemicals. The FR nonwoven composite fabric based garments of the current invention address these issues to provide solution to the technical problem at hand with better economics.

Spunlaced nonwoven composite fabrics made from blends of commodity and otherwise flammable fibers, such as nylon and cotton, are rendered permanently fire resistant and highly abrasion resistant/field durable by the addition of a suitable combination of chemicals, such as phosphate ester, melamine formaldehyde and acrylic copolymer. The uniqueness of this invention has been to create FR nonwoven composite fabrics that impart fire protection at significantly reduced cost to the customers, and with enhanced field durability.

There are several FR fabrics that are available in the marketplace for utilization in fire protective garments that have not been adopted by the U.S. military. The most widely used ones in the private industry are FR chemical treated, 100% cotton fiber based, woven fabrics. The FR cotton based fabrics are significantly less expensive than Nomex® fiber based fabrics, almost one-third in price as that of Nomex® fabrics. Most FR cotton fabrics are produced by application of phosphonium sulfate based FR finishing chemical followed by an ammonia cure process where the FR molecules are polymerized within the cotton fibers. This process "locks the FR molecules" within the cotton fibers and thus makes the fabric permanently fire resistant and maintains the FR characteristics after repeated laundering cycles. This technology has been around since the 1960's and is widely used in children's clothing for FR protection. For an FR combat garment, a minimum of 25 home launderings is accepted as a standard by the U.S. military without any significant loss in FR, physical properties and appearance.

The limitation of the FR treated cotton fabrics is that the fabrics need to be at least about 9 ounces per square yard to yield the desired FR protection and physical properties. This makes the fabric very bulky and uncomfortable to wear. Also, cotton as such is not a strong or durable fiber and the FR treatment additionally damages the physical properties of the cotton fiber based fabrics. Addition of up to 12% high tenacity nylon fiber with the cotton fibers has been accepted in the industry to produce fabrics with reduced fabric weight while maintaining the strength and durability characteristics of heavier 100% cotton fabrics. Increasing the level of nylon fibers beyond 12% by weight in blends with cotton fibers does not produce permanently fire resistant woven fabrics as the nylon fibers burn, melt drip and thus worsening the flammability of the fabrics. Cotton fibers form char whereas the synthetic fibers melt and drip on application of fire. The higher the cotton content, the better FR protection on the upside while, lower the physical and durability characteristics on the downside. The inventors are not aware of any commercial woven FR chemical treated fabrics produced via application of phosphate ester—ammonia cure process that contain more than 12% by weight of nylon or polyester, or any other commodity synthetic fiber.

Although, the Nomex® fiber based FR fabrics can be made lighter, stronger and more breathable than the FR chemical treated cotton fabrics, the main disadvantage of Nomex® based fabrics currently used by the U.S. military has been the fact that it is prohibitively more expensive, at least 3 time more expensive per linear yard than the FR cotton fabrics. Additionally, the Nomex® fabrics tested have been shown to have poorer abrasion resistance and thus field durability. The nonwoven composite fabrics are being promoted by the U.S. military for enhanced FR protection and field durability characteristics while offering economical advantage.

Although nonwoven composite fabrics offer numerous technical advantages over the traditional woven fabrics in the area of functional apparel, as that of military FR combat uniform garment, thus far the nonwoven based garments have been used only for disposable medical garments and lab coats because of their lack of textile-like qualities. The success in creating a field durable, repeatedly launderable and permanently fire resistant nonwoven composite fabric based military garment is dependent on a combination of various factors such as the appropriate selection and utilization of fibers and fiber blends, such as synthetic and cellulosic fibers narrowed down to nylon and cotton fibers, web formation such as carded nonwoven webs to make the individual layers of the nonwoven composite fabrics and web bonding or consolidation techniques such as spunlacing or hydroentangling process, and additive chemicals such as a combination of phosphate ester, acrylic and melamine formaldehyde. In addition to being light weight, soft, durable, highly tear resistant and fire resistant, the nonwoven composite fabric based garment of the current invention offers enhanced breathability or air permeability to provide relief from heat stress in extreme hot weather conditions, barrier against insects and sand particles, as well as other advantages.

Garment Construction: The present invention is directed to the design and manufacture of a field durable, repeatedly launderable, permanently fire resistant, comfortable and economical garment, as shown in FIG. 1, which is based on an FR nonwoven composite fabric suitable for use in military combat uniform clothing. The nonwoven composite fabric used to make the military combat uniform consists of outer and inner nonwoven webs/layers with an optional rip-stop layer, made from a loosely knitted fabric, sandwiched between the two said nonwoven layers, as shown in FIGS. 2A and 2B. The outside layer of the nonwoven composite fabric is readily printable with traditional inks and pigments employed in the textile industry and made highly abrasion resistant to withstand the rigors of battlefield conditions. Although there are numerous patent references available on the use of nonwoven layers with and without the use of supporting scrim in the literature, most of them have been applied for use in enhancing the woven or knitted fabric properties or for applications other than functional garments, such as a military combat uniform. The apparel use for these types of materials has been considered only for fusible interlinings of woven fabrics or for bottom weights and cuffs of garments. This is due to the inherent limitations in creating acceptable nonwoven fabric based garments that are wash durable and pilling resistant.

Rip-Stop Element: The art of incorporating a reinforcing scrim has been illustrated and widely published in the literature. The tearing resistance of durable nonwoven composite fabric for the garments, especially for the military applications, can be significantly improved by incorporation of a rip-stop or loosely knit fabric with very good textile drape characteristics when inserted as the middle layer of the composite fabric. For the current invention, however, the middle layer knit material, preferably made of higher melting engineering polymers such as polyester and nylon, is mainly used to provide sufficient stretch recovery or dimensional stability during the down stream finishing chemicals processing and end use. Otherwise, the spunlace nonwovens have been shown to exhibit high degree of irrecoverable stretching in one direction leading to significant shrinkage of the fabrics in width.

Web Formation—Carded and Spunlaid: The manufacture of the current field durable, repeatedly launderable and permanently fire resistant nonwoven composite fabric based garment, comprises the steps of providing the outer and inner layers of the garment made of carded nonwoven webs containing otherwise flammable, and commodity nylon staple fibers (nylon 66 fibers Type 420 from Invista, S.C., USA) in blends with natural cellulosic fiber such as cotton (HiQ from Barnhardt, Charlotte, N.C.). Although nylon and cotton are the main fibers in the fabric construction, other flammable synthetic fibers, such as various polyester fibers, bicomponent synthetic fibers, may be used in conjunction with flammable natural fibers and regenerated cellulosic fibers, such as viscose rayon and cellulose acetate. In some embodiments, the otherwise flammable and meltable synthetic fibers comprise no more than 50% of the blend. Other high strength fibers such as para-aramids with trade names such as Kevlar® and Twaron® may be used in conjunction with the traditional synthetic fibers for improving the overall FR and physical properties of the nonwoven composite fabric. Suitable fiber lengths for staple fibers range from 0.5-5 inches, and more specifically, from 1-3 inches and fineness for staple fibers and continuous filaments range from 0.5-5 denier per filament (dpf), and more specifically, 1-3 dpf. The cross section for continuous filaments is uniform round. The basis weight for individual nonwoven webs/layers ranges from 0.5-10 oz/yd$^2$, and more specifically from 1.5-3 oz/yd$^2$.

An optional rip-stop layer made of a loosely knitted fabric containing higher melting polymers, such as polyester and nylon, may be positioned in between the outside and inside layer of the garment for enhancing the dimensional stability of the fabrics, especially during the down stream processing to avoid excessive shrinkage in width of nonwoven fabrics. For example, a loosely knitted fabric with the trade name PQ 74, made of nylon yarns or TG-17 L made of polyester yarns is commercially available from Apex Mills, Inwood, N.Y. The individual layers by themselves are weak, and do not qualify for use in the intended application. However, the composite fabric exhibits a synergistic improvement in physical and mechanical properties that provide distinct advantages in the end use application.

Bonding-Spunlace: The individual carded webs or nonwoven layers are bonded to each other by a process using the energy from water jets, called hydroentangling or spunlacing, to create the nonwoven composite fabric of the garment shown in FIG. 1. With reference to FIG. 3, therein is illustrated a manufacturing flow chart for producing the field durable, repeatedly launderable and permanently fire resistant nonwoven composite fabric to assemble the garment. Two carded webs containing blends of nylon and cotton fibers are placed on a conveyor belt with or without the optional rip-stop knitted fabric layer and subjected to initial bonding using high pressure water jets as in the hydroentangling or spunlacing process. The fibers from both the layers are intimately bonded at the interface creating a soft, textile-like yet very strong and coherent nonwoven composite. The fabric layers are subjected to a pre-wetting step using a water jet pressure of about 800 PSI and numerous hydroentangling jet manifolds with at least two jet manifolds operating at a minimum pressure of 3000 PSI on the top and bottom of the nonwoevn composite fabric. The hydroentangling or spunlacing machine has numerous water jet manifolds similar to that of commercial equipment from Nora fin GmBH, called a Fleissner Aquajet. It is sufficient, however, to position five water jet manifolds on each side of the composite to achieve complete bonding. Optionally, the composite fabric may be re-passed reversing the side of the fabric to smoothen the other side of the fabric as that comes in contact with the wire mesh cloth attached to the drums of the hydroentangling machine. Numerous literature is available on the process of hydroentangling machine.

Dyeing and Printing: The spunlaced nonwoven composite fabric can be dyed and printed using traditional textile dyes and pigments made from vat, disperse, acid and basic types, using standard textile equipment, such as continuous dye range, jet dyeing and screen printing machines. Thus far, dyeing and printing of nonwovens has been a challenge in the industry, but it is possible to obtain a uniform camouflage pattern as shown in FIG. 1 with the proper selection of fiber blends and fabric construction. The fabrics can then be printed with the camouflage design, such as the new computer-generated pixel design printed on the U.S. Marine Corps combat utility uniform or other camouflage designs for both woodland (green color) and dessert (beige) areas. The colorfastness of the print pattern can be established along with wash durability of the current nonwovens. Since the fiber blend in the nonwoven composite fabric is nylon/cotton, vat dyeing and printing can be carried out to obtain the required camouflage design. Vat dyeing also imparts good color fastness and long-term durability of the print, as the vat dyeing process locks in the dye molecules within the individual fibers. The fabric at this stage is still flammable and possesses similar abrasion resistance properties as that of a woven fabric, but still lacks wash durability, as the fibers have the tendency to rearrange themselves during the laundering process. The individual fibers need to be "locked in place" by the use of thermal bonding or finishing chemicals. Thermal bonding melts the fibers and forms a film at the bond points. Whereas, this may be desired for enhancing the abrasion resistance, the fabric becomes stiffer and potentially more flammable. Chemical bonding is preferred because the flammability and stiffness issues may be controlled in a better fashion by the proper selection of chemical additives and finishing treatment processes.

Finishing Treatment: The printed nonwovens are treated with standard textile finishing additives/chemicals utilizing a number of techniques including, but not limited to, dip, pad, spray or knife coating methods. The main focus in the finishing stage is to add an appropriate FR chemical that not only renders the fabric permanently fire resistant but also aids in abrasion resistance and wash durability. One such chemical called Pyrosan CFR, a phosphonium sulfate type, manufactured by Emerald Chemicals, Charlotte, N.C., is used to mainly make the cotton fibers of the nylon/cotton blend nonwoven fabrics permanently fire resistant. The spunlaced nonwoven fabrics that are flammable are padded with Pyrosan CFR at around 40% by weight of the fabric and then subjected to an ammonia cure process. The resultant phosphorous-ammonia based fire retardant molecules are polymerized within the cotton fibers. This process imparts permanent FR characteristics to the nonwoven fabrics, while enhancing the surface abrasion and launderability. The uniqueness of this invention is such that the woven fabrics containing similar blend ratios of the same fibers, nylon and cotton, do not have permanent FR characteristics and are found to be completely flammable just after a single home laundering cycle. The nonwoven composite fabrics treated with the FR chemicals of the current invention, however, have been shown to maintain the initial fire resistant characteristics even after 25 home laundering cycles.

Additional film forming fiber binder chemicals may be used to further enhance the launderability and abrasion resistance without significantly affecting the textile drape, air permeability or mechanical properties. The acrylic copolymer and melamine binder chemicals are available under the trade names Freetex NWA and Aerotex 3730 from Emerald Chemicals of Charlotte, N.C., USA. Typical use of these chemicals is about less than 10% by weight of the nonwoven composite fabric.

Specific Production Methods of FR Nonwoven Composite Fabrics:

Two types of FR chemical treated nonwoven composite fabrics were made using the following ingredients and construction:

The outer and inner layers of the base non-FR nonwoven composite fabric were made at the same time using a 90" wide commercial scale tandem carding machines from Spinnbau, such as the ones located at Norafin GmBH, Mildenau, Germany.

In one embodiment, the two carded webs/layers were made using a blend of 60% cotton and 40% nylon fibers. The nylon fibers, with a trade name Type 420, were obtained from Invista fibers in bales. The fibers had a cut length of 1.5 inches and a denier of 1.5. The cotton fibers bales with a trade name of HiQ were obtained from Barnhardt Manufacturing, Charlotte, N.C., USA. The cotton fibers had an average length of 1 inch and a fineness value of 5 micronaire. The individual webs had a basis weight of 1.75 ounces per square yard. A middle layer scrim/knitted fabric made of all polyester fiber with a trade name TG-17 L, and with a fabric basis weight of 0.8 ounces per square yard from Apex Mills, N.Y., USA was used for the nonwoven fabric composite fabric formation. The spunlaced nonwoven fabric composite base fabric called 110499 had a basis weight of 4.3 ounces per square yard.

In another embodiment, the two carded webs were made using a blend of 55% cotton, 35% nylon and 10% Kevlar® fibers without the middle layer knitted fabric. The high performance Kevlar® fibers were obtained from Dupont® chemicals. The spunlaced nonwoven composite fabric called 12591 had a basis weight of 5 ounces per square yard. The objective was to create a nonwoven composite fabric with Kevlar® fibers to provide the required dimensional stability.

The tufted fibers from the packaged bales were thoroughly opened, cleaned and blended using a series of rollers before being fed into a carding machine. The fibers were weighed within an error margin of 5% before being carded. The carding machine was set a speed of 30 feet per minute. The carding machines equipped with a turbo mixer roller were utilized to obtain random carded nonwoven webs that were used as individual layers of the nonwoven fabric composite.

The individual nonwoven webs/layers were intimately bonded with and without the scrim using the Fleissner Aqua Jet Spunlacing equipment located at Norafin GmBH. The following process parameters were employed at the spunlacing equipment:

Pressure in PSI of Water Jets: #1 at 290 PSI, #2 at 1160 PSI, #3 at 1740 PSI, #4 at 3000 PSI #5 at 3000 PSI, #6 at 2030 PSI and #7 at 2030 PSI.

Production Speed—30 Feet Per Minute. Final Fabric Width—72 Inches.

The two main jets responsible for intimate bonding of the individual nonwoven layers are set at 3000 pounds per square inch.

The nonwoven composite fabrics were visually inspected for any potential delamination of the individual layers. The bonded nonwoven composite fabrics were wound onto individual spools and shipped for down-stream dyeing, printing, FR chemical and secondary finishing chemical treatments.

The spunlaced nonwoven composite fabrics were dyed and printed with the USMC desert camouflage pattern using the production scale continuous dyeing and printing range with vat dyes, such as the ones located at Carlisle Finishing Co., Carlisle, S.C. At this stage, care is taken to minimize any shrinkage issues of the fabrics. The print pattern is developed and made sure that is within the military specification for color and IR reflectance.

The printed spunlace nonwoven composite fabrics were then padded with the phosphonium sulfate based fire retardant chemical, with a trade name Pyrosan-CFR, sold by Emerald Performance Chemicals, Charlotte, N.C., USA. A traditional commercial scale padding and curing machine, such as the one located at Mount Vernon Mills, Trion, Ga., USA, was used to impregnate the printed spunlaced nonwoven composite fabric. The FR chemical was applied at 35-40% by dry weight of the nonwoven composite fabric. The FR molecule was polymerized within the cotton fibers of the fabric using an ammonia-cure process. The FR treated fabrics were then subjected to application of secondary finishing chemicals, such as the melamine formaldehyde with a trade name, Aerotex 3730, at a level of 6-12% by weight and a modified acrylic copolymer, with a trade name, Freetex NWA, at a level of 0.5-5% by weight of the nonwoven composite fabric. The secondary finishing chemicals were obtained from Emerald Performance Chemicals. The fabric was then mechanically softened to provide the desired textile drape and hand.

The FR nonwoven composite fabric was then assembled into suitable military garments, such as the USMC combat utility uniform and Crewmen Vehicle Coveralls (CVC).

EXAMPLES

Permanent FR Characteristics:

The following FR nonwoven composite fabric styles were made using the above processing scheme. For comparative purposes, the current woven fabric used in the USMC combat uniform garment is included (*).

TABLE 1

Fabric Compositions

| Fabric ID | Cotton or Natural Fiber (%) | Nylon or Synthetic Fiber (%) | Kevlar ® (%) | Rip-Stop Type | Nominal FR Chemical Finished Basis Weight (oz/sq. yd.) |
|---|---|---|---|---|---|
| 110499 | 49 | 51 | 0 | TG-17 L | 6.5-7.0 |
| 12591 | 55 | 35 | 10 | 0 | 6.5-7.0 |
| USMC Woven NYCO Fabric* | 50 | 50 | 0 | 0 | 6.5-7.0 |

A commonly known detergent without any softeners or bleach was used for the home laundering cycles, which were performed according to the procedures of AATCC 124. Each one of the fabrics was subjected to 25 home laundering cycles. The initial fabrics before laundering and the laundered fabrics were tested according to ASTM D 6413, Vertical Burn Test to determine the permanency of the FR characteristics. The sample size used for the test was 10" long by 3" wide. A flame length of 0.5 inch was used for the study, which was supported by a source of propane gas. The samples were mounted to face the flame source for 12 seconds before the flame source was cut-off. Fabrics with a maximum char length of 6 inches without any melt drip or after flame are considered to pass the ASTM D 6413 test. Fabrics with higher than 6 inches and an after flame of over 2 seconds are considered to fail the ASTM D 6413 Vertical Burn Test. A total of 5 different samples were tested in each direction and the average values were reported as shown in the following table:

TABLE 2

Test Results of ASTM D 6413 for Various FR chemical treated fabrics

| Fabric ID | Char Length Initial | | Char Length After 25 Laundering | | After Flame Initial | | After Flame After 25 Laundering | | Result |
|---|---|---|---|---|---|---|---|---|---|
| | Warp | Fill | Warp | Fill | Warp | Fill | Warp | Fill | |
| 110499 | 5.0 | 4.9 | 5.4 | 5.4 | 0 | 0 | 0 | 0 | Pass |
| 12591 | 2.2 | 2.7 | 2.5 | 3.8 | 0 | 0 | 0 | 0 | Pass |
| USMC Woven NYCO Fabric* | 6.0 | 5.7 | 10 | 10 | 0 | 0 | +30 | +30 | Fail |

*treated with FR Chemical CFR at 40% by weight of fabric

It is very evident from the table above that the FR chemical treated nonwoven composite fabrics have permanent FR characteristics unlike the 50/50 nylon/cotton fiber based woven fabrics treated using the same FR chemicals. The addition of Kevlar® fibers provided sufficient fabric integrity during the burning process and thus improved the test results for fabric ID 12591.

Field Durability/Abrasion Resistance:

The FR nonwoven composite fabrics have been tested for their abrasion resistance/field durability per ASTM D 3884 and compared against the standard FR fabric used in the military made of Nomex® fibers. This fabric has a nominal basis weight of 6 ounces per square yard. The fabric samples have been tested using HS-18, the most abrasive set of wheels on a Taber Abrader machine. A sample size of 6"×6" was chosen for the tests. The fabric samples were abraded for 100 cycles with vacuum. The abraded samples were cut into 6"×4" long samples with the abraded area intact and tested for breaking strength using ASTM D 5034. The average percent retained strength after abrasion of 5 test samples per fabric type is calculated as follows:

Percent Retained Strength=(Breaking Strength After Abrasion/Breaking Strength Before Abrasion)× 100

TABLE 3

Abrasion Resistance Characteristics

| Fabric ID | Percent Retained Strength after Taber Abrasion using HS-18 wheels After 100 cycles |
|---|---|
| 110499 | 79 |
| 12591 | 69 |
| USMC Woven NYCO Fabric* | 25 |
| USMC Woven Nomex ® Fabric** | 8 |

The test results in the table above indicate that the FR chemicals treated nonwoven composite fabrics outperformed the woven Nomex® and the NYCO non-FR fabrics in terms of their abrasion resistance or field durability characteristics.

Repeated Launderability Characteristics:

The FR nonwoven samples have been repeatedly laundered for 25 cycles using a standard detergent without any bleach or scent chemicals per AATCC 124. The FR nonwoven composite samples were compared with the non-FR nonwoven base fabrics without any FR and down-stream chemical treatment. The objective is to illustrate the enhancement in wash durability or launderability after applying the finishing chemical treatments on the nonwoven fabric construction. The fabrics were given a rating of 1 to 5 with 5 being the best without any surface pilling and 1 the worst with a lot of pilling in terms of fabric appearance. A total of 5 different samples per fabric type were chosen for the study with a sample size of 16"×16". The FR nonwoven fabrics maintained the initial fabric appearance without any pilling whereas the untreated nonwoven composite fabrics exhibited a lot of pilling and damage to the fabric. It is assumed that the standard woven fabrics exhibit good launderability and thus not included in the test.

TABLE 4

Launderability Rating Results per AATCC 124 Test

| Fabric ID | AATCC 124 Rating |
|---|---|
| 110499 | 5 |
| 12591 | 4 |
| Untreated Nonwoven Composite Fabric | 1 |

It is very evident from the test results shown in the above table that the FR chemical treated nonwoven fabric composite fabrics have outperformed the untreated nonwoven composite fabrics in terms of their launderability characteristics.

Garment Assembly: The garment for military uniforms is assembled employing conventional sewing machines using standard nylon or cotton threads, as is readily apparent in FIG. 1. Unlike the woven fabrics, there is no raveling and wastage of fabrics/yarns when stitching the garment of the present invention. In addition, because of higher synthetic fiber content, it is possible to assemble the military uniform using laser and ultrasonic bonding methods to provide leak-proof seams. This is of importance for manufacturing protective garments used against chemical and biological agents for Homeland Security applications.

Although specific emphasis has been made on the design and manufacture of military combat uniform and outdoor sporting garments using the nonwoven composite fabric of the present invention, other potential applications for fabrics of similar construction could be in the area of durable, wash and fire resistant medical garments, workmen uniforms, children clothing, other apparel, covers, tentage, awning, equipage items, etc.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A field durable, repeatedly launderable and permanently fire resistant nonwoven composite fabric based garment, where the composite fabric of the garment comprises:
a nonwoven web outer layer,
a nonwoven web inner layer and
a middle rip-stop layer of loosely knitted flexible fabric sandwiched between the outer and inner layers,
wherein the outer and inner nonwoven layers of the composite fabric of the garment comprise a blend of otherwise flammable and meltable staple length synthetic fibers, cellulosic fibers and high strength aramid fibers where the otherwise flammable and meltable staple length synthetic fibers comprise polyester or nylon fibers and the cellulosic fibers comprise cotton or viscose rayon fibers, wherein the flammable and meltable staple length synthetic fibers comprise no more than 50% of the blend,
wherein the rip-stop middle layer comprises a loosely knitted, non-elastic fabric composed of yarns selected from the group consisting of polyester and nylon;
the nonwoven web outer layer, middle layer of knitted fabric and inner layer are bonded together by entangling fibers from each layer intimately with fibers of other layers by high pressure water jets to obtain complete fiber bonding at an interface between the layers; and
wherein the composite fabric is treated with a fire retardant chemical comprising phosphonium sulfate which is polymerized within and permanently bonded to the fibers of the composite fabric using an ammonia-cure process and an abrasion resistance enhancing chemical comprising a blend of an acrylic copolymer and a melamine formaldehyde,
the composite fabric exhibiting properties required to pass ASTM D 6413 Standard Test Method for Flame Resistance of Textiles (Vertical Test) with no melt drips and no after flame and retaining a minimum of 50% of the initial fabric breaking strength after 100 cycles in the Taber Machine abrasion resistance test according to ASTM D 3884 using the most abrasive HS-18 type wheels, and the composite fabric exhibiting virtually no pilling or damaged appearance with a rating of no less than 4 after a minimum of 25 home laundering cycles per AATCC 124, Appearance of Fabrics After Repeated Home Laundering.

2. The field durable, repeatedly launderable and permanently fire resistant nonwoven composite fabric based garment of claim 1, wherein bonding the outer, middle and inner layers of the base nonwoven composite fabric together is achieved by high pressure water jets operating with a minimum water pressure of 800 lbs/in$^2$ for prewetting the nonwoven layers and a minimum water pressure of 3000 lbs/in$^2$ for bonding the outer and inner layers by hydroentanglement thereof using a machine with a plurality of manifolds of at least 5 jets each, where the manifold jets working on both the outer and inner layers of the nonwoven composite fabric for intimate bonding of the individual nonwoven layers.

3. The field durable, repeatedly launderable and permanently fire resistant nonwoven composite fabric based garment of claim 1 wherein the fabric contains 10% high strength aramid fibers wherein the fibers are para-aramid fibers.

4. The field durable, repeatedly launderable and permanently fire resistant nonwoven composite fabric based garment of claim 1, wherein the outer layer is dyed and printed.

5. The field durable, repeatedly launderable and permanently fire resistant nonwoven composite fabric based garment of claim 1, wherein the durable and fire resistant nonwoven fabric garment is assembled by a stitching method selected from the group consisting of conventional needle and thread stitching, ultrasonic stitching and laser weld stitching.

6. A field durable, repeatedly launderable and permanently fire resistant nonwoven composite fabric based garment, where the composite fabric of the garment comprises:
a nonwoven web outer layer,
a nonwoven web inner layer and
a middle rip-stop layer of loosely knitted flexible fabric sandwiched between the outer and inner layers,
wherein the inner layer and outer layer nonwoven webs comprise a blend of otherwise flammable and meltable synthetic staple length fibers and cellulose fibers where the otherwise flammable and meltable staple length synthetic fibers comprise polyester and nylon fibers, and the cellulose fibers comprise cotton or viscose rayon fibers, the flammable and meltable staple length synthetic fibers comprising 35% to 50% of the blend, wherein the rip-stop middle layer comprises a loosely knitted non-elastic fabric composed of yarns selected from the group consisting of polyester and nylon;

the nonwoven web outer layer, middle layer and inner layer are bonded together by entangling fibers from each layer intimately with fibers of other layers by high pressure water jets operating with a minimum water pressure of 800 lbs/in² for prewetting the layers and a minimum water pressure of 3000 lbs/in² for bonding the outer and inner layers by hydroentanglement thereof, using a machine with a plurality of manifolds of at least 5 jets each, the manifold jets working on both the outer and inner layers of the nonwoven composite fabric to obtain complete fiber bonding at an interface between the layers;

wherein the composite fabric is treated with a fire retardant chemical comprising phosphonium sulfate which is polymerized within and permanently bonded to the fibers of the composite fabric using an ammonia-cure process and a fabric abrasion resistance enhancing chemical comprising a blend of an acrylic copolymer and a melamine formaldehyde, the composite fabric exhibiting properties required to pass ASTM D 6413, Standard Test Method for Flame Resistance of Textiles (Vertical Test) with no melt drips and after-flame and retaining a minimum of 50% of the initial fabric breaking strength after 100 cycles in the Taber Machine abrasion resistance test according to ASTM D 3884 using the most abrasive HS-18 type wheels, and the composite fabric exhibiting virtually no pilling or damaged appearance with a rating of no less than 4 after a minimum of 25 home laundering cycles per AATCC 124, Appearance of Fabrics After Repeated home Laundering; and the outer layer of the nonwoven composite base fabric is dyed and printed.

7. The field durable, repeatedly launderable and permanently fire resistant nonwoven composite fabric based garment of claim 6, wherein the fabric contains 10% high strength aramid fibers wherein the fibers are para-aramid fibers.

8. A field durable, repeatedly launderable and permanently fire resistant nonwoven composite fabric based garment, where the composite fabric of the garment comprises:

a nonwoven web outer layer, a nonwoven web inner layer and wherein the outer and inner nonwoven layers of the composite fabric of the garment comprise a blend of otherwise flammable and meltable staple length synthetic fibers and cellulosic fibers where the otherwise flammable and meltable staple length synthetic fibers comprise polyester or nylon fibers and the cellulosic fibers comprise cotton or viscose rayon fibers the flammable and meltable staple length synthetic fibers comprising no more than 50% of the blend;

the nonwoven web outer layer and nonwoven web inner layer are bonded together by entangling fibers from each layer intimately with fibers of other layer by high pressure water jets to obtain complete fiber bonding at an interface between the layers; and wherein the composite fabric is treated with a fire retardant chemical comprising phosphonium sulfate which is polymerized within and permanently bonded to the fibers of the composite fabric using an ammonia-cure process and an abrasion resistance enhancing chemical comprising a blend of an acrylic copolymer and a melamine formaldehyde, the composite fabric exhibiting properties required to pass ASTM D 6413, Standard Test Method for Flame Resistance of Textiles (Vertical Test) with no melt drips and no afterflame and retaining a minimum of 50% of the initial fabric breaking strength after 100 cycles in the Taber Machine abrasion resistance test according to ASTM D 3884 using the most abrasive HS-18 type wheels, and the composite fabric exhibiting virtually no pilling or damaged appearance with a rating of no less than 4 after a minimum of 25 home laundering cycles per AATCC 124, Appearance of Fabrics After Repeated Home Laundering.

9. The field durable, repeatedly launderable and permanently fire resistant nonwoven composite fabric based garment of claim 8, wherein bonding the outer and inner layers of the base nonwoven composite fabric together is achieved by high pressure water jets operating with a minimum water pressure of 800 lbs/in² for prewetting the nonwoven layers and a minimum water pressure of 3000 lbs/in² for bonding the outer and inner layers by hydroentanglement thereof using a machine with a plurality of manifolds of at least 5 jets each, where the manifold jets working on both the outer and inner layers of the nonwoven composite fabric for intimate bonding of the individual nonwoven layers.

10. The field durable repeatedly launderable and permanently fire resistant nonwoven composite fabric based garment of claim 8, wherein the fabric contains 10% high strength aramid fibers wherein the fibers are para-aramid fibers.

11. The field durable, repeatedly launderable and permanently fire resistant nonwoven composite fabric based garment of claim 8, wherein the outer layer is printed with a camouflage design selected from the group consisting of woodland green and desert beige.

12. The field durable, repeatedly launderable and permanently fire resistant nonwoven composite fabric based garment of claim 8, wherein the durable and fire resistant nonwoven fabric garment is assembled by a stitching method selected from the group consisting of conventional needle and thread stitching, ultrasonic stitching and laser weld stitching.

* * * * *